United States Patent
Rothschild et al.

(10) Patent No.: US 11,135,976 B2
(45) Date of Patent: Oct. 5, 2021

(54) VEHICLE DOOR MIRROR ASSEMBLY

(71) Applicant: Honda Motor Co., Ltd., Tokyo (JP)

(72) Inventors: Jacob A. Rothschild, Marysville, OH (US); Oscar A. Caraan, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 16/577,173

(22) Filed: Sep. 20, 2019

(65) Prior Publication Data

US 2021/0086694 A1    Mar. 25, 2021

(51) Int. Cl.
| | | |
|---|---|---|
| *B60R 1/072* | (2006.01) | |
| *B60R 1/076* | (2006.01) | |
| *B60R 1/074* | (2006.01) | |

(52) U.S. Cl.
CPC .............. *B60R 1/072* (2013.01); *B60R 1/074* (2013.01); *B60R 1/076* (2013.01)

(58) Field of Classification Search
CPC .......... B60R 1/072; B60R 1/074; B60R 1/076
USPC .................................................. 359/841, 877
See application file for complete search history.

(56) References Cited

U.S. PATENT DOCUMENTS

| | | | |
|---|---|---|---|
| 3,800,619 A | | 4/1974 | McIntyre |
| 4,306,465 A | | 12/1981 | Manzoni |
| 4,362,068 A | | 12/1982 | Manzoni |
| 4,372,177 A | | 2/1983 | Yamana |
| 4,606,619 A | | 8/1986 | Yamana |
| 4,626,083 A | * | 12/1986 | Nakayama .............. B60R 1/074 359/841 |
| 4,626,084 A | * | 12/1986 | Kumai .................... B60R 1/074 359/841 |
| 4,786,157 A | * | 11/1988 | Mori ....................... B60R 1/074 359/841 |
| 5,210,651 A | | 5/1993 | Shibuya et al. |
| 5,579,178 A | * | 11/1996 | Mochizuki .............. B60R 1/074 359/841 |
| 6,094,027 A | * | 7/2000 | Willmore ................ B60R 1/072 318/466 |
| 6,132,050 A | * | 10/2000 | Sakata ...................... B60R 1/07 248/478 |
| 6,243,218 B1 | | 6/2001 | Whitehead |
| 6,672,731 B2 | | 1/2004 | Schnell et al. |
| 7,137,717 B2 | * | 11/2006 | Ohashi .................... B60R 1/072 359/877 |

(Continued)

FOREIGN PATENT DOCUMENTS

KR    19990027195    4/1999

*Primary Examiner* — Ricky D Shafer
(74) *Attorney, Agent, or Firm* — Rankin Hill & Clark LLP (57) ABSTRACT

A foldable exterior rearview mirror assembly for a vehicle includes a housing having a glass assembly secured thereto. A support arm mounts the housing an associated vehicle side door. The support arm has a closed end portion at least partially received within an aperture in an underside of the housing. A pivot shaft is mounted to the closed end portion of the support arm. The housing is foldable about the pivot shaft between a drive or use position and a folded or park position. The closed end portion of the support arm includes an opening, and a wiring harness for connection to associated electronics housed in the housing is received through the opening and routed beneath the pivot shaft into the housing.

20 Claims, 5 Drawing Sheets

(56) References Cited

U.S. PATENT DOCUMENTS

| | | | |
|---|---|---|---|
| 7,360,908 B1* | 4/2008 | Duroux | B60R 1/074 359/841 |
| 10,259,391 B2 | 4/2019 | Sakai et al. | |
| 2004/0090690 A1* | 5/2004 | Schuurmans | B60R 1/07 359/877 |

* cited by examiner

VEHICLE DOOR MIRROR ASSEMBLY

BACKGROUND

A known mirror assembly for a vehicle side door generally includes a glass assembly mounted to a housing of the mirror assembly. The glass assembly includes a mirror backing plate that is secured to an adapter plate housed in the housing. The adapter plate is connected to a glass actuator which allows the user to adjust the viewing position of the mirror by rotating the adapter plate. Typically, the housing also rotates around an inner base member of a fixed support arm in a way that allows the housing to fold forward or backward. This is useful during an impact or preventing damage when parked. For an auto-fold style mirror assembly, a bracket housed in the housing is fastened to a power fold actuator that is attached to the inner base member via fasteners or a spring. For a manual fold style mirror assembly, the bracket presses against the inner base member using a spring. With both styles of mirror assemblies, a cylindrical pivot tube connects the inner base member of the support arm to the housing. A mirror wiring harness extends through the pivot tube, over the bracket, and is connected to relevant electronics in the housing. This means that an inner diameter of the pivot tube opening needs to be large to allow a wiring harness coupler(s) to pass through. If the inner diameter is too small, the wires of the wiring harness will have to be fed through the opening and the coupler(s) individually pinned onto the wires afterwards. This leads to either a large packaging space for the housing or a costly assembly process.

BRIEF DESCRIPTION

According to one aspect, a foldable exterior rearview mirror assembly for a vehicle comprises a housing having an associated glass assembly secured thereto. A support arm mounts the housing to an associated vehicle side door. The support arm has a closed end portion at least partially received within an aperture in an underside of the housing. A pivot shaft is mounted to the closed end portion of the support arm. The housing is foldable about the pivot shaft between a drive or use position and a folded or park position. The closed end portion of the support arm includes an opening, and a wiring harness for connection to associated electronics housed in the housing is received through the opening and routed beneath the pivot shaft into the housing.

According to another aspect, a foldable exterior rearview mirror assembly for a vehicle comprises a housing having an associated glass assembly secured thereto. A support arm mounts the housing to an associated vehicle side door. The support arm includes an outer base member and an inner base member received in the outer base member. The inner base member has a closed end portion at least partially received within the housing. A sidewall of the closed end portion includes an opening for receiving a grommet. A pivot shaft is mounted to the closed end portion of the support arm. A wiring harness is routed through the grommet and beneath the pivot shaft for connection to associated electronics housed in the housing. A seal mounted to the housing sealingly engages the outer base member as the housing is folded about the pivot shaft between a drive or use position and a folded or park position.

According to another aspect, a foldable exterior rearview mirror assembly for a vehicle comprises a housing having an associated glass assembly secured thereto. A support arm mounts the housing to an associated vehicle side door. The support arm includes a cylindrical shaped closed end portion at least partially received within the housing. A sidewall of the closed end portion includes an opening for routing of a wiring harness for connection to associated electronics housed in the housing. A pivot shaft for the housing is mounted to the closed end portion of the support arm. The pivot shaft includes a base portion secured to an upper wall of the closed end portion and a cylindrical shaped shaft portion extending outwardly from the base portion. A fastener secures the base portion of the pivot shaft to the closed end portion of the support arm, and the support arm includes a removable door to provide access for installation or removal of the fastener.

DETAILED DESCRIPTION

Figure 1:
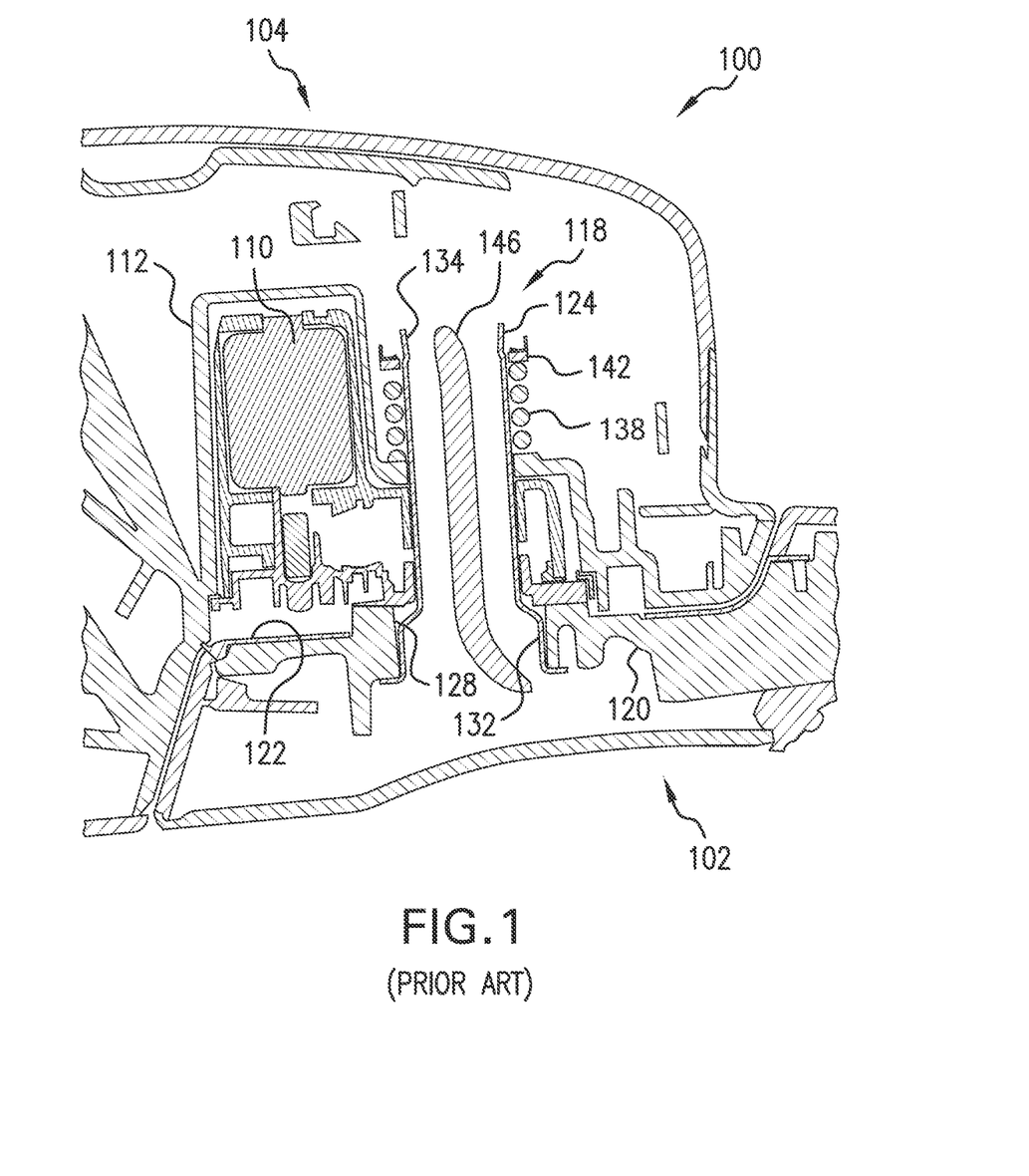
FIG. 1 is a cross-sectional view of a known mirror assembly for a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 is a cross-section of a known mirror assembly 100 for an associated vehicle. The mirror assembly 100 is attached to a base or support arm 102 adapted to be affixed to an associated vehicle side door, specifically to a forward side of an associated front door. The mirror assembly 100 generally includes a housing 104 movably mounted to the support arm and a glass assembly (not shown) attached to the housing 104. A power fold actuator 110 is mounted or attached within the housing 104 by a bracket 112. The bracket 112 is connected to a pivoting structure 118 that pivotally mounts to an inner base member 120 of the support arm 102. A seal 122 is provided on the inner base member 120 between the housing 104 and the support arm 102. The pivoting structure 118 includes a pivot tube 124 extended upwardly from an opening 128 in the inner base member 120 to facilitate the relative rotation between the housing 104 and the support arm 102. Typically, the pivot tube 124 has one end portion 132 directly connected to the inner base member 120 and an opposite end portion 134 extended through the bracket 112 and the power fold actuator 110. A compression spring 138 is mounted over the end portion 134 and is retained thereon by a washer 142. As depicted, a wiring harness 146 is routed through the pivot tube 124 and into an interior of the housing 104 for connection to associated mirror electronics (not shown). As indicated previously, this requires the pivot tube 124 to have an oversized inner diameter to allow a wiring harness coupler(s) to pass through the pivot tube. If the inner diameter is too small, the individual wires of the wiring harness will have to be fed through the pivot tube 124 and the coupler(s) individually pinned onto the wires afterwards.

Figure 2:
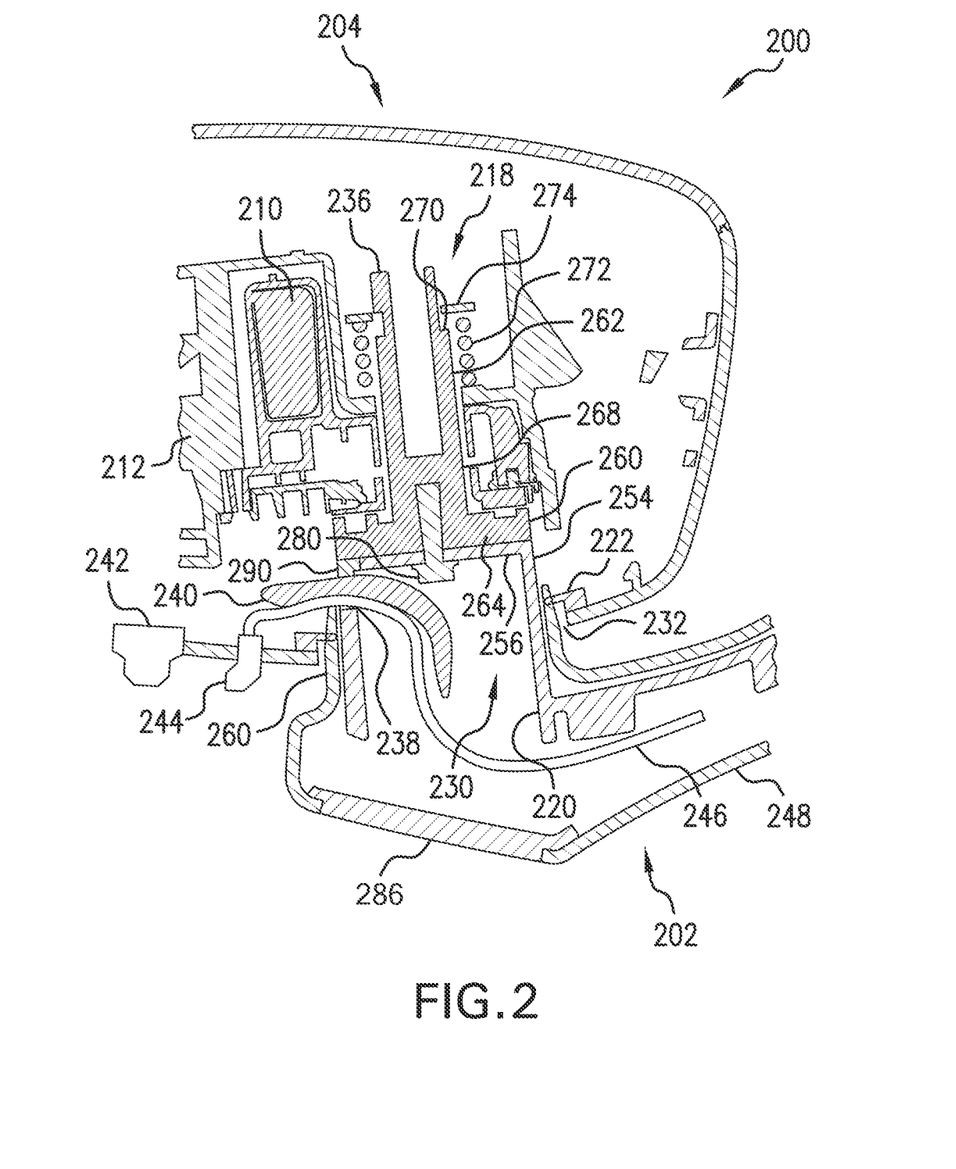
FIG. 2 is a cross-sectional view of an exemplary mirror assembly according to the present disclosure.

FIG. 2 is a cross-section of an exemplary mirror assembly 200 for an associated vehicle according to the present disclosure. The mirror assembly 200 is attached to a base or support arm 202 adapted to be affixed to an associated vehicle side door, specifically to a forward side of an associated front door. The mirror assembly 200 generally includes a housing 204 movably mounted to the support arm and a glass assembly (not shown) attached to the housing 204. A power fold actuator 210 is mounted or attached within the housing 204 by a bracket 212, which provides an internal support structure for the housing. The bracket 212 is connected to a pivoting structure 218 that pivotally mounts to an inner base member 220 of the support arm 202. It should also be appreciated that the power fold actuator 210 is operable to move (via the pivoting structure 218) the housing 204 relative to the support arm 202 between a drive or use position and a folded or park position. A seal 222 is provided on the housing 204 to provide a seal between the housing 204 and the support arm 202.

In contrast to the pivoting structure 118 of the known mirror assembly 100, the exemplary pivoting structure 218 does not include a pivot tube extended through the inner base member 220 for the routing of a wiring harness. Instead, as will be described below, the support arm 202 has a closed end portion 230 at least partially received within an aperture 232 in an underside of the housing 204. The pivoting structure 218 includes a pivot shaft 236 mounted to the closed end portion 230 of the support arm 202. The closed end portion 230 of the support arm 202 includes an opening 238, and a wiring harness 240 for connection to associated electronics housed in the housing 204 is received through the opening 238 and routed beneath the pivot shaft 236 through a lower portion of the housing 204. Further depicted in FIG. 2, the associated electronics housed in the housing 204 can include a camera 242 mounted to the housing 204. A washer nozzle 244 directed toward the camera and adapted to spray a cleaning fluid for cleaning dirt and debris from the camera can also be mounted to the housing 204. As shown, the washer nozzle 244 can be positioned near the support arm 202 so that the washer nozzle is not in a field of view of the camera 242. A washer tube 246 for supplying the cleaning fluid to the washer nozzle 244 can be routed with the wiring harness 240 through the opening 238 in the closed end portion 230.

Figure 3:
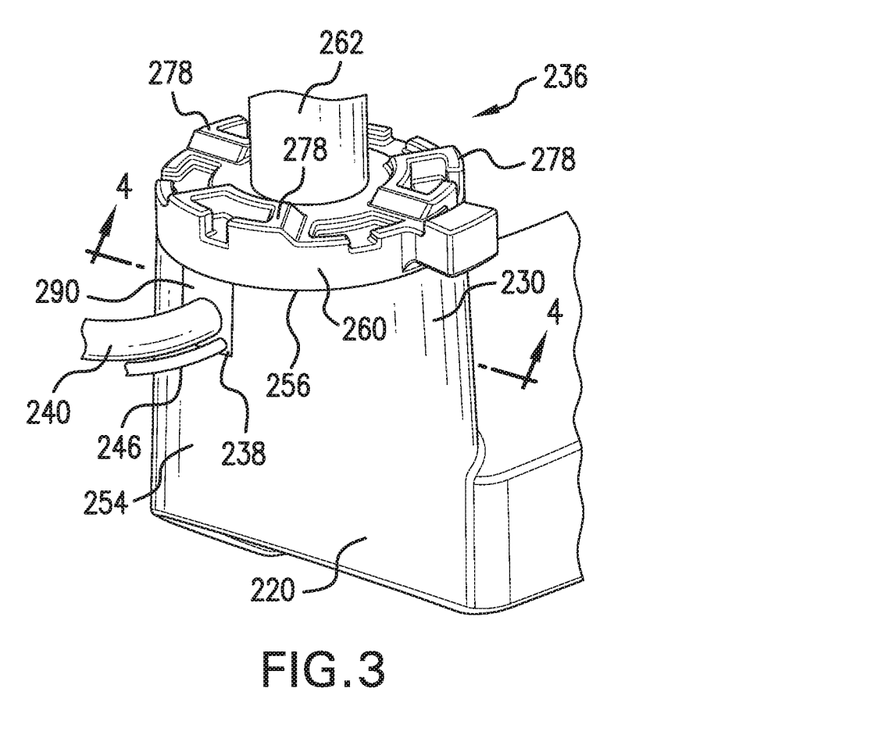
FIG. 3 is a partial perspective view of a pivot shaft mounted to a support arm of the exemplary mirror assembly.

More particularly, according to the present embodiment, the support arm 202 includes the inner base member 220 received in an outer base member 248. The inner base member 220 has the closed end portion 230, which extends outwardly from an open end portion 250 of the outer base member 248. The closed end portion 230, which can be cylindrical shaped, is defined by a sidewall 254 and an upper wall 256 of the inner base member 220. The exemplary pivot shaft 236 includes a base portion 260 and a shaft portion 262 extending outwardly from the base portion. The base portion 260 is secured to the upper wall 256 of the closed end portion 230. As shown, the base portion 260 includes a planar bottom surface 264 and is sized to fit within an outer perimeter of the upper wall 256. For example, the base portion 260 can have a diameter substantially matching a diameter of the upper wall 256. The shaft portion 262, which can be cylindrical shaped, is extended upwardly from the base portion 260 to facilitate the relative rotation between the housing 204 and the support arm 202. As shown in FIG. 2, a lower end portion 268 of the shaft portion 262 is closed by the base portion 260 to prevent wind noise through the shaft portion. This is in contrast to the known pivot tube 124 which can provide an air pathway into the housing 104 (see FIG. 1). An upper end portion 270 of the shaft portion 262 is extended through the bracket 212 and the power fold actuator 210. A compression spring 272 is mounted over the upper end portion 270 and is retained thereon by a washer 274. Because the wiring harness 240 is not routed through the shaft portion 262, the upper end portion 270 can have an outer diameter that is substantially reduced compared to the known pivot tube 124. Further depicted in FIG. 3, the base portion 260 can be provided with raised touch-off features or ramped sections 278 which are selectively engaged by one of the power fold actuator 210 and the bracket 212 as the housing 204 is moved relative to the support arm 202. This engagement can maintain or lock the housing 204 in position relative to the support arm 202 to prevent unwanted rotation and vibration of the housing 204. As indicated, the pivot shaft 236 is mounted directly to the closed end portion 230 of the inner base member 220 of the support arm 202. In the depicted aspect, a fastener 280 secures the pivot shaft 236 to the closed end portion 230, and in turn, the housing 204 to the support arm 202. To provide access for installation or removal of fastener 280, a door 286 aligned with the closed end portion 230 is removably connected to the outer base member 248 of the support arm 202. This allows the entirety of the operational components and structures associated with the housing 204 to be first assembled, and then to fasten this subassembly to the support arm 202.

Figure 4:
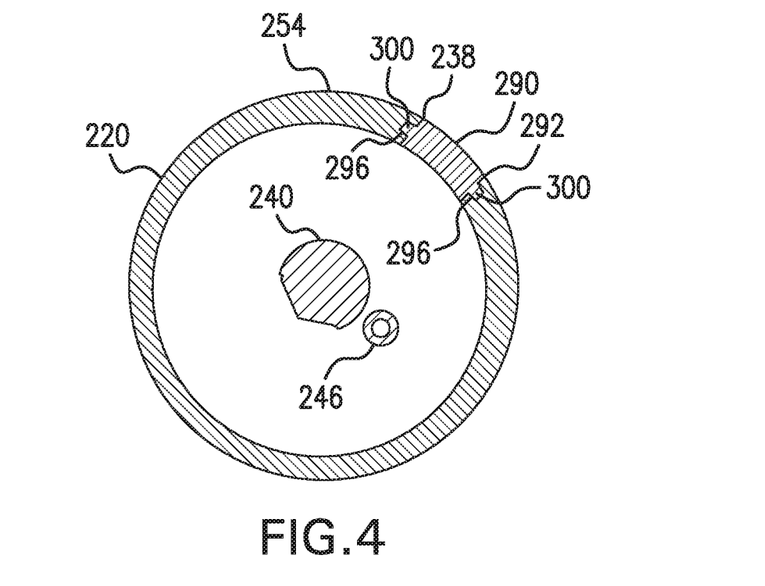
FIG. 4 is a cross-sectional view taken along line 4-4 of FIG. 3.
Figure 5:
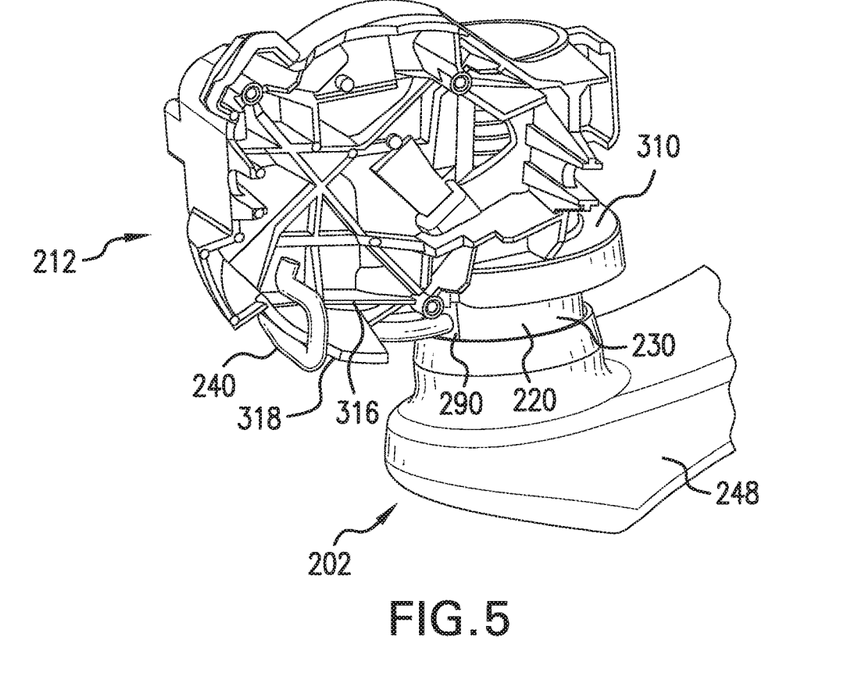
FIGS. 5 and 6 are perspective views of a bracket mounted to the support arm of the exemplary mirror assembly.
Figure 6:
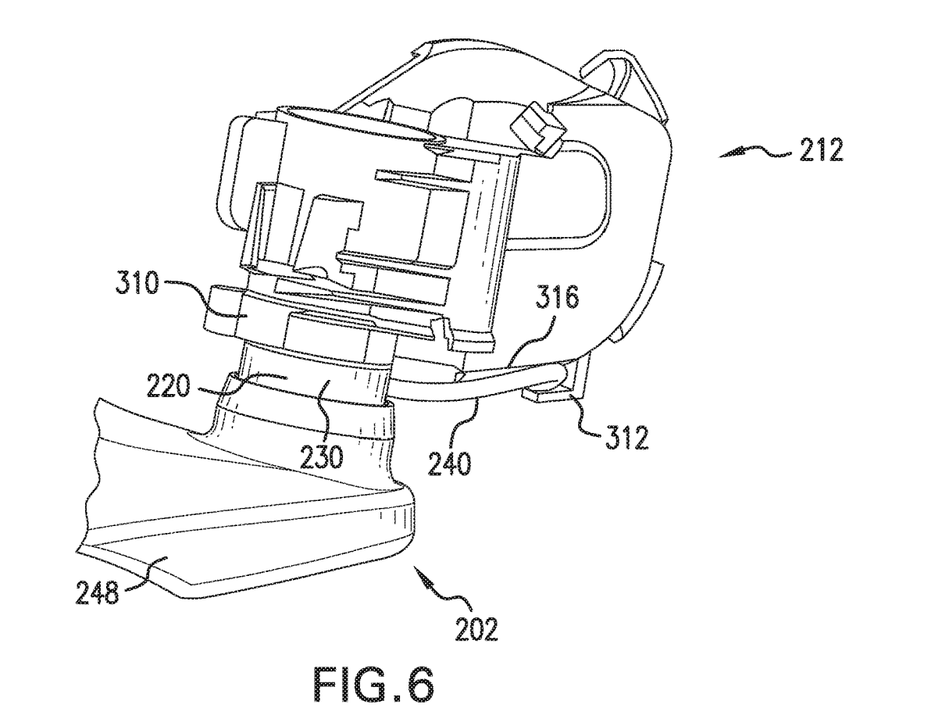

With the construction of the pivot shaft 236 described above, the wiring harness 240 (and optionally the washer tube 246) is received through the opening 238 in the closed end portion 230 of the support arm 202 and routed beneath the pivot shaft 236 into the interior of the housing 204. In the depicted aspect of FIGS. 2-4, a grommet 290 for the wiring harness 240 (and optionally the washer tube 246) is received in the opening 238. The grommet 290 secures the wiring harness 240 (and optionally the washer tube 246) to the closed end portion 230 and also seals the opening 238 to prevent dirt and water intrusion through the opening 238 and into the housing 204. According to one embodiment, the opening 238 in the closed end portion 230 is in the form of a channel 292 formed in both the sidewall 254 and the upper wall 256 of the closed end portion. Provided on opposite sides of the channel are grooves 296. The grommet 290 is slidingly received in the channel 292, with guides 300 of the grommet 290 received in the grooves 296. With the wiring harness 240 (and optionally the washer tube 246) received in the grommet 290 and the grommet received in the opening 238, the grommet 290 can then be secured to the closed end portion 230 by being at least partially compressed within the opening 238 by the pivot shaft 236 fastened to the closed end portion. Further, because the wiring harness 240 is routed through the closed end portion 230, the bracket 212 includes a routing feature for the wiring harness that is aligned with the closed end portion 230. In FIGS. 5 and 6, a lower portion 310 of the bracket 212 is adapted to be fitted over the pivot shaft 236. A first angled flange 312 extended downward from a lower side 316 of the bracket 212 faces the opening 238 in the closed end portion 230 of the inner base member 220. A second flange 318 is extended from the lower side 316 away from the first flange 312. As depicted, the wiring harness 240 is routed beneath the lower side 316, through the first flange 312 and around the second flange 318. Therefore, because the wiring harness 240 is not extended through the pivot shaft 236 and instead is routed along the bracket 212, a wiring harness coupler(s) (not shown) is not limited in size by the pivot shaft 236.

Figure 7:
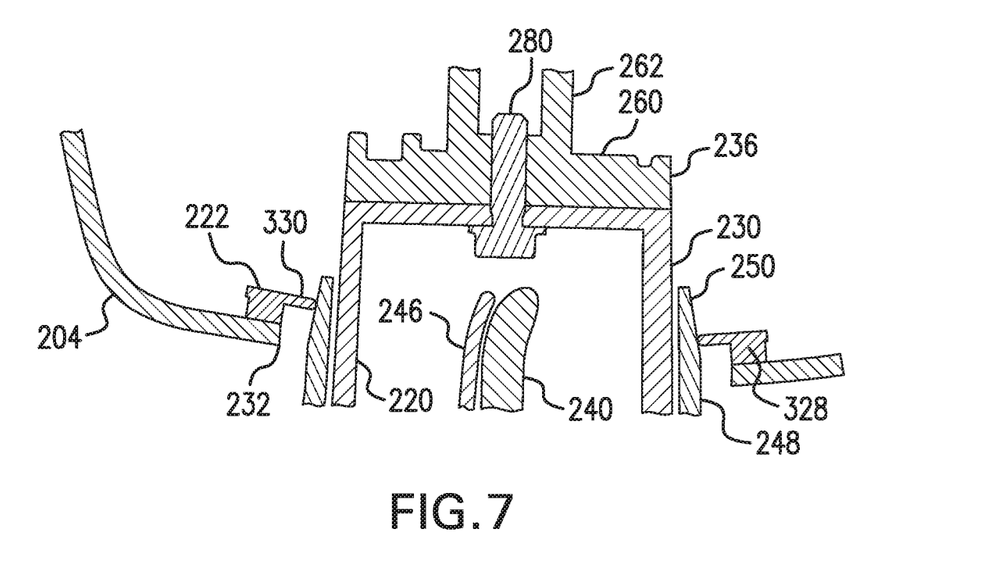
FIG. 7 is a partial cross-section of the exemplary mirror assembly showing an interference of a seal with the support arm.
Figure 8:
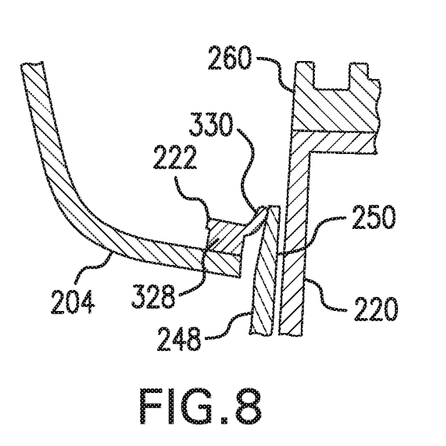
FIG. 8 is a partial view of FIG. 7 showing an installed condition of the seal.
Figure 9:
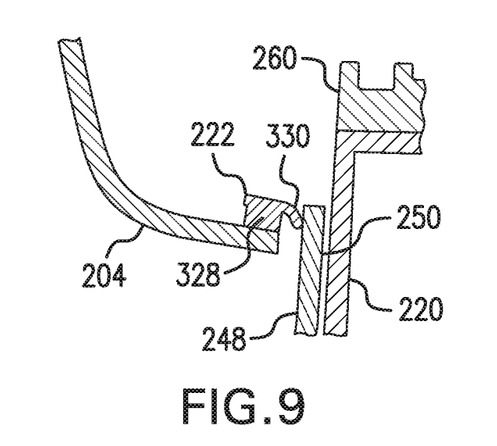
FIG. 9 is a partial view similar to FIG. 8 but showing an improper condition of the seal.

As depicted in FIG. 7, the seal 222 surrounds the closed end portion 230 of the support arm 202 and sealingly engages the open end portion 250 the outer base member 248. The seal 222 is at least partially mounted within the aperture 232 in the underside of the housing 204 and generally closes over the aperture 232 to limit water or dirt intrusion into the housing 204. Further, the seal 222 is formed of a flexible material and is designed to allow for unrestricted movement of the housing 204 between the drive or use position and the folded or park position relative to the support arm 202. In the shown aspect, the seal 222 includes a base 328 affixed to an inner surface of the housing 204 and a lip 330 extending from the base 328 into the aperture 232. The seal is provided beneath the opening 238 in the closed end portion 230 so that the seal does not interfere with the wiring harness 240 (see FIG. 2). The open end portion 250 of the outer base member 248 is wedge shaped in cross-section and the lip 330 is in contact with the open end portion 250. As indicated previously, the housing 204 will slightly raise relative to the support arm 202 as the housing is moved to the folded or parked position and will slightly lower relative to the support arm 202 as the housing is moved to the drive or use position. The wedge shape of the outer base member 248 prevents the lip 330 from folding downward as the housing is moved (see FIG. 8 where the lip 330 remains biased upward during movement of the housing 204). This provides a more uniform sealing condition between the housing 204 and the support arm 202. FIG. 9 depicts the outer base member 248 without the wedge shape and the lip 330 in an improper inverted position when the housing 204 is slightly raised relative to the support arm 202.

As is evident from the foregoing, as compared to the known mirror assembly 100, the exemplary mirror assembly 200, with the pivot shaft 236 fastened to the closed end portion 230 of the support arm 202 and the wiring harness 240 routed through the closed end portion directly into the housing 204, has an improved assembly and reduced packaging space. The replacement of the known pivot tube 124 for the wiring harness with the grommet-sealed side opening 238 in the inner base member 220 reduces wind noise. The re-routing of the wiring harness 240 through the inner base member 220 near the lower housing aperture 232 also allows for reduction in the size of the actuator supporting structure (i.e., the bracket 212 and cylindrical shaft member 262 of the pivot shaft 236). A corresponding compactness in the design of the actuator supported structure provides space-saving efficiencies associated with the housing 204. In addition, the sidewall 254 of the inner base member 220 can have a reduced diameter which improves packaging and reduces weight of the mirror assembly, and reduces a size of a cutline area of the housing 204 (i.e., a size of the aperture 232). Also, the size of the seal 222 required between the moving housing 204 and the fixed support arm 202 is reduced and the configuration simplified. Further, the reduction of a contact area of the seal 222 to the outer base 248 lowers a sliding resistance to rotate the housing 204 between the drive or use position and the folded or park position. The features of the seal 222 facilitate the maintaining of a consistent seal shape for improved sealing as the housing is moved relative to the support arm.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A foldable exterior rearview mirror assembly for a vehicle comprising:
   a housing having an associated glass assembly secured thereto;
   a support arm for mounting the housing to an associated vehicle side door, the support arm having a closed end portion at least partially received within an aperture in an underside of the housing;
   a pivot shaft mounted to the closed end portion of the support arm, the housing is foldable about the pivot shaft between a drive or use position and a folded or park position,
   wherein the closed end portion of the support arm includes an opening, and a wiring harness for connection to associated electronics housed in the housing is received through the opening and routed beneath the pivot shaft into the housing.

2. The mirror assembly of claim 1, wherein the pivot shaft includes a base portion secured to an upper wall of the closed end portion, and a shaft portion extending outwardly from the base portion, a lower end portion of the shaft portion closed by the base portion to prevent wind noise through the shaft portion.

3. The mirror assembly of claim 2, wherein a bracket is supported within the housing for mounting a power fold actuator, a lower part of the bracket including a routing feature for the wiring harness that is aligned with the closed end portion.

4. The mirror assembly of claim 1, wherein a grommet for the wiring harness is received in the opening in the closed end portion of the support arm, the grommet is configured to seal the opening to prevent dirt and water intrusion through the opening and into the housing.

5. The mirror assembly of claim 4, wherein the opening in the closed end portion of the support arm is in the form of a channel formed in both a sidewall and an upper wall of the closed end portion, the grommet slidingly received in the channel and secured to the closed end portion by being at least partially compressed within the opening by the pivot shaft.

6. The mirror assembly of claim 1, wherein a seal is mounted to the housing and surrounds the closed end portion of the support arm, the seal provided beneath the opening in the closed end portion.

7. The mirror assembly of claim 6, wherein the support arm includes an outer base member and an inner base member received in the outer base member, the inner base member has the closed end portion, the seal sealingly engaging the outer base member.

8. The mirror assembly of claim 7, wherein the seal includes a base affixed to an inner surface of the housing and a lip extending outwardly from the base, the lip is in contact with the outer base member as the housing is moved relative to the support arm.

9. The mirror assembly of claim 8, wherein a distal end portion of the outer base member is wedge shaped to prevent the lip of the seal from folding downward as the housing is moved relative to the support arm.

10. The mirror assembly of claim 1, wherein a fastener secures the pivot shaft to the closed end portion of the support arm, and a door is removably connected to the support arm to provide access for installation or removal of the fastener.

11. The mirror assembly of claim 1, wherein the support arm includes an outer base member, the closed end portion is cylindrical shaped and is formed as part of an inner base member received in the outer base member, a grommet for the wiring harness is secured in the opening of the closed end portion.

12. A foldable exterior rearview mirror assembly for a vehicle comprising:
    a housing having an associated glass assembly secured thereto;
    a support arm for mounting the housing to an associated vehicle side door, the support arm includes an outer base member and an inner base member received in the outer base member, the inner base member has a closed end portion at least partially received within the housing, a sidewall of the closed end portion includes an opening for receiving a grommet;
    a pivot shaft mounted to the closed end portion of the support arm;
    a wiring harness routed through the grommet and beneath the pivot shaft for connection to associated electronics housed in the housing; and
    a seal mounted to the housing sealingly engaging the outer base member as the housing is folded about the pivot shaft between a drive or use position and a folded or park position.

13. The mirror assembly of claim 12, wherein the pivot shaft includes a base portion secured to an upper wall of the closed end portion, and a shaft portion extending outwardly from the base portion, a lower end portion of the shaft portion is closed by the base portion to prevent wind noise through the shaft portion.

14. The mirror assembly of claim 12, wherein a washer tube for connection to an associated camera washer nozzle mounted to the housing is routed with the wiring harness through the grommet.

15. The mirror assembly of claim 12, wherein the opening in the closed end portion is in the form of a channel formed in both the sidewall and an upper wall of the closed end portion of the support arm, the grommet secured in the opening by connection of the pivot shaft to the closed end portion.

16. The mirror assembly of claim 12, wherein a distal end portion of the outer base member is wedge shaped to prevent a lip of the seal from folding downward as the housing is moved relative to the support arm.

17. The mirror assembly of claim 12, wherein a fastener secures the pivot shaft to the closed end portion of the inner base member, and the outer base member includes a removable door to provide access for installation or removal of the fastener.

18. A foldable exterior rearview mirror assembly for a vehicle comprising:
    a housing having an associated glass assembly secured thereto;
    a support arm for mounting the housing to an associated vehicle side door, the support arm includes a cylindrical shaped closed end portion at least partially received within the housing, a sidewall of the closed end portion includes an opening for routing of a wiring harness for connection to associated electronics housed in the housing;
    a pivot shaft for the housing is mounted to the closed end portion of the support arm, the pivot shaft includes a base portion secured to an upper wall of the closed end portion and a cylindrical shaped shaft portion extending outwardly from the base portion;
    wherein a fastener secures the base portion of the pivot shaft to the closed end portion of the support arm, and the support arm includes a removable door to provide access for installation or removal of the fastener.

19. The mirror assembly of claim 18, wherein a seal is mounted to the housing sealingly engaging the support arm, and an outer surface of the support arm is wedge shaped to prevent a lip of the seal from folding downward as the housing is moved relative to the support arm.

20. The mirror assembly of claim 18, wherein a grommet for the wiring harness is received in the opening in the closed end portion of the support arm, the grommet is at least partially compressed within the opening by the pivot shaft.

* * * * *